United States Patent Office 3,845,195
Patented Oct. 29, 1974

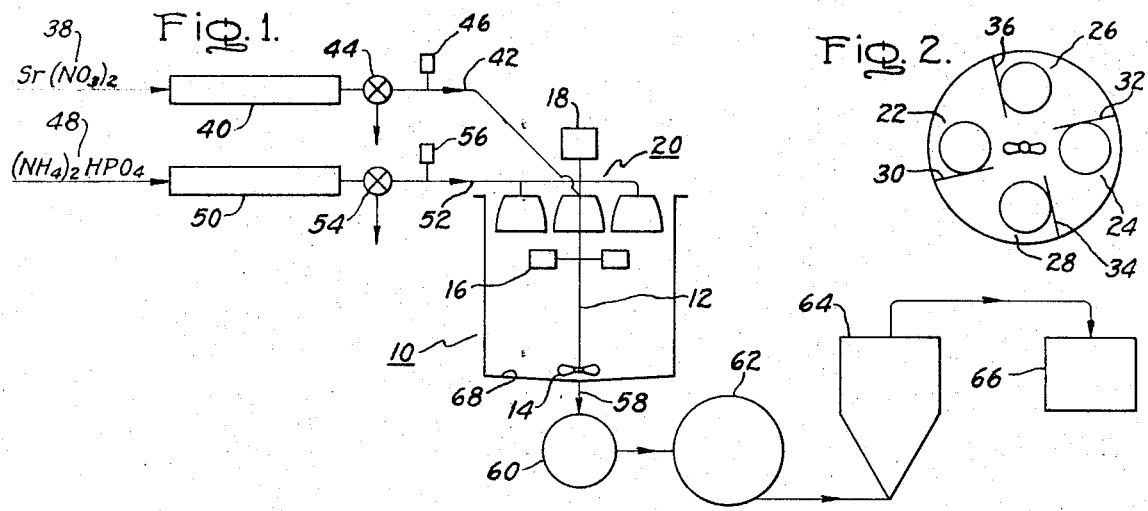
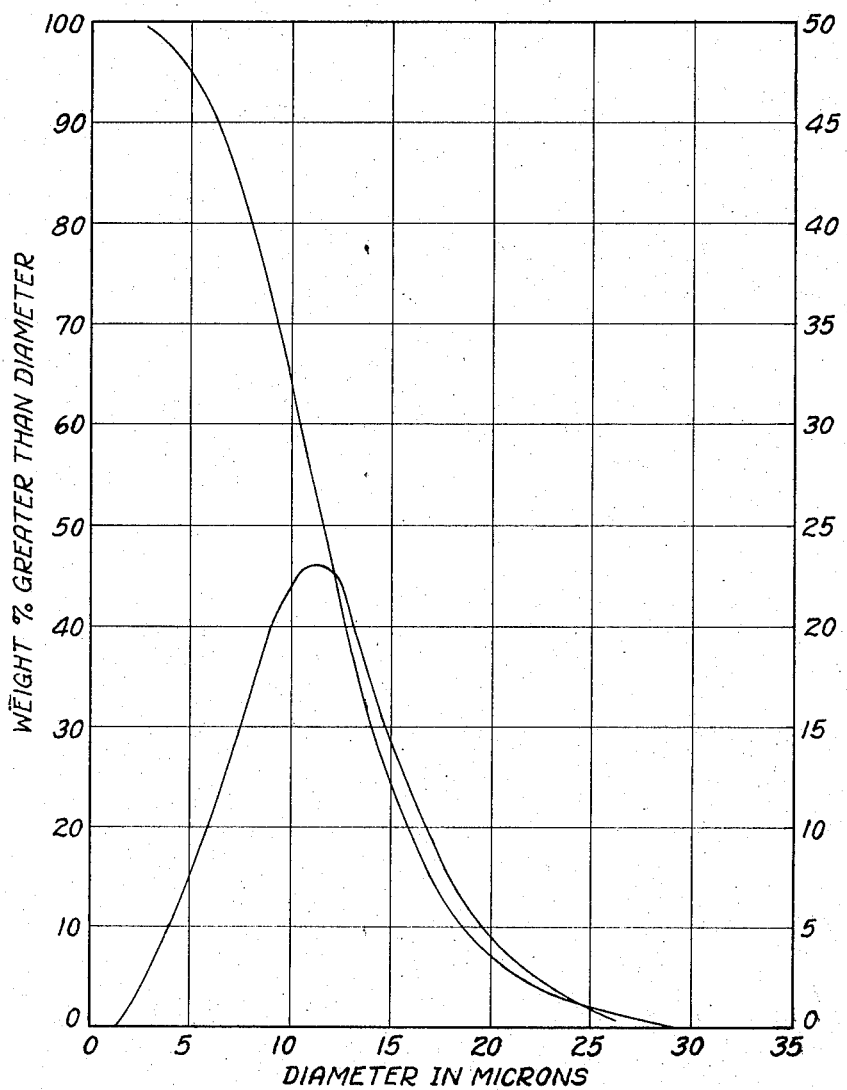

3,845,195
METHOD FOR CONTINUOUS PREPARATION OF CRYSTALLINE SOLIDS
Larry J. Kramer, Lyndhurst, Ohio, assignor to General Electric Company
Filed May 11, 1972, Ser. No. 252,296
Int. Cl. C01b *15/16, 25/26*
U.S. Cl. 423—308         6 Claims

ABSTRACT OF THE DISCLOSURE

This invention relates to continuous preparation of crystalline solids. More particularly, this invention provides a method and apparatus which can be used for continuous preparation of slightly soluble crystalline solids from a liquid solution medium in larger particle size, less contamination from the reaction medium and more perfect form than can be obtained by conventional means. In the present method, liquid diffusion means are employed to separately introduce liquid solutions of the reactants into a moving body of liquid from which the crystals are precipitated. In the preferred embodiments, powdered phosphor materials including $SrHPO_4$ and $SrCO_3$ crystals are continuously formed having a larger average particle size and more narrow size distribution than can be obtained by any known continuous process.

BACKGROUND OF THE INVENTION

The use of both $SrHPO_4$ and $SrCO_3$ crystals in the manufacture of fluorescent phosphors has been known for some time, and these materials are conventionally prepared by a continuous precipitation process as crystals having an average particle size in the range 1–3 microns diameter from aqueous solutions of the reactants. Other conventional methods of preparing these materials utilize a batch process having the customary drawbacks in addition to problems encountered with the size and form of the precipitated crystals. Regarding phosphor applications, the small particle size of a powdered luminescent material and imperfect crystalline form are both recognized to reduce the luminescent efficiency of the phosphor. Additionally, it is also well recognized that impurities from residual starting materials in the phosphor crystals are generally higher for smaller size particles unless specialized and costly removal techniques are employed. A recently discovered batch process for homogeneous precipitation of $SrHPO_4$ crystals of luminescent grade is disclosed in U.S. Pat. 3,384,453 which produces an average particle diameter somewhat in excess of 3 microns diameter.

It is also known to grow larger size crystals of slightly soluble substances as disclosed in U.S. Pat. 3,371,036. In this process, the single crystals are grown by seeding in a solvent for the starting materials which are supplied to the growth chamber after passage through separate diffusion means intended to avoid perturbation from random environmental influences. The admixture of the reactant solutions in this process is further regulated to avoid precipitation of the reaction product.

SUMMARY OF THE INVENTION

It has now been discovered that improved crystals of slightly soluble crystalline substances can be prepared continuously having improved properties. More particularly, a continuous method and apparatus have been discovered which provide crystals of larger size, more perfect crystalline form, and more free of residual impurities than can be precipitated from solution by conventional techniques. In carrying out the present invention, the reactant solutions are diffused through porous media into a moving quantity of solvent such that localized concentration and temperature effects are avoided during the chemical reaction. By controlling the chemical reaction in this overall manner, the degree of supersaturation and reaction rate is controlled to provide precipitation of the product crystals which have been grown to the desired size and form. Process control can be exercised in carrying out the present invention through continuous pumping of fresh reactant solutions to the reaction vessel which can further be accompanied by continuous removal of the precipitated crystals and the already reacted starting materials from the reactor. As will be more fully described in connection with the hereinafter disclosed preferred embodiments, the outflow from the reactor can be processed by washing and drying the crystals, all in a continuous fashion.

BRIEF DESCRIPTION OF THE DRAWINGS

FIG. 1 is a schematic flow diagram depicting a preferred embodiment of an apparatus employed in carrying out the process of the present invention;

FIG. 2 is a cross-sectional view of the reaction vessel depicted in FIG. 1; and

FIG. 3 is a graph depicting the particle size distribution for $\alpha$-$SrHPO_4$ crystals prepared in accordance with the present invention along with a plot of weight percent of said crystals greater in diameter versus diameter in microns.

DESCRIPTION OF THE PREFERRED EMBODIMENTS

Briefly stated, the process of the present invention can be carried out for preparation of $\alpha$-$SrHPO_4$ phosphor material in the form of a plurality of crystals having a larger average particle size and more narrow size distribution than is conventionally obtained by means of the following steps:

(a) continuously feeding a solution of a strontium salt to first liquid diffusion means disposed in a reaction vessel containing a moving body of solvent,
(b) simultaneously and continuously feeding a solution of a dibasic phosphate compound to second liquid diffusion means spaced apart from said first diffusion means in the reaction vessel, and
(c) heating both solutions while mixing to form a $SrHPO_4$ precipitate in the reaction vessel.

Comparable results are obtained in carrying out the above-defined embodiment to form luminescent grade $SrCO_3$ by substituting a soluble carbonate compound such as $(NH_4)_2CO_3$ for the dibasic phosphate compound therein recited. While several factors influence the results of the present crystallization process including rate of reaction, concentration of the individual reactant solutions selected, temperature of reaction, rates of mixing the reactant solutions in the reaction vessel, as well as size and type of the reaction vessel, the relative effect of these factors is already well known in the field of chemical processes, hence need not be unduly further expained in the present application. Correspondingly, the particular liquid diffusion means herein employed can be varied in a number of ways while still providing a porous media to impede velocity flow of the reactant solutions to the reaction vessel and thereby avoid localized concentration gradients or gelation of the reactor contents. Suitable diffusion means to carry out the present process comprise an open pore structure of non-reactive material which can be formed with glass fibers, glass beads, plastics, metals, wood and other materials. Such diffusion means can further be assisted to effect initial separation of the reactant solution when introduced to the reaction vessel by means of baffles and other known type separation means.

In FIG. 1, it is depicted schematically a preferred embodiment of an apparatus for carrying out the present process. The reaction vessel 10 may consist of a 50-gallon, glass-lined, and heat-jacketed reactor such as that already being commercially manufactured by the Pfaudler Company. Said reaction vessel may be equipped with stirrer means 12 which may consist conveniently of a 7" diameter propeller 14 mounted on a shaft which further includes a spaced apart pair of 3" x 2½" paddles 16 being driven by a one-quarter horsepower air motor 18. Said reaction vessel further includes in assembly of liquid diffusion means 20 having associated baffle members to separately introduce the reactant solutions into the reaction vessel. Said assembly comprises a pair of inter-connected diffusing elements 22 and 24 to introduce one of the reactant solutions at opposite sides of the reaction vessel being operatively associated with a second pair of diffusing elements 26 and 28 to introduce a second reactant solution at opposite sides of the reaction vessel which are displaced from introduction of the first reactant solution. The physical separation of reactant solutions when first introduced to a moving body of solvent in the reaction vessel is further promoted by means of individual baffle members 30, 32, 34 and 36 which are disposed radially inward from the inside cylindrical surface of the reaction vessel. A supply means 38 for the first reactant solution is connected to heat exchanger 40 in order to preheat the starting material before introduction to the reaction vessel through conduit means 42. Said conduit means are connected to a pair of the diffuser elements previously mentioned and further include valve means 44 as well as a thermometer 46 for process regulation. The second reactant solution is provided in the same manner from supply means 48 to a heat exchanger 50 which is then fed by conduit means 52 leading to the remaining pair of interconnected diffusing elements disposed in the reaction vessel. Thermometer 56 and valve means 54 enable separate process regulation of the second reactant solution prior to introduction into the reaction vessel. The reaction vessel further includes a discharge opening 58 for continuous removal of the crystalline precipitate along with spent mother liquor with said discharge opening being connected by conduit means to a conventional slurry pump 60 for additional process handling. The slurry pump feeds the precipitate continuously to a vacuum filter wheel 62 which can be adapted in conventional fashion to continuously supply the filtered precipitate to a dryer 64. Said filter means can be further equipped to rinse the filter cake with a suitable solvent to remove residual impurities so that the dried crystals can be automatically conveyed to a suitable storage bin 66.

A cross-sectional view of the particular reaction vessel described above is shown in FIG. 2 which more clearly illustrates the cooperation between the baffle members and the liquid diffusion elements in the apparatus. By placing an individual baffle member adjacent to each diffusing element, the principal flow of the emerging reactant solution is desirably directed to a central reaction zone in the reactor without significant opportunity for localized concentration gradients or gels to form. While this particular embodiment has not been found critical in that initial separation of the reactant solutions was successfully carried out without using the baffle members, their use could prove helpful in other reaction vessel configurations where there is greater likelihood of localized concentration gradients to occur. It should also be noted with respect to the flat bottom 68 of the reaction vessel shown in FIGS. 1-2 that some remixing of already precipitated crystals can take place unless the product is removed from the reactor. More particularly, it has been found that some of the already precipitated crystals can reach a particle size of 30 microns and greater by such reintroduction into the reaction zone of the reactor which extends the overall size distribution of the crystalline product being obtained. To help avoid this result, the bottom of the reaction vessel can simply be configured in a downwardly extending conical shape along with being provided with an opening of sufficient size to remove the precipitate continuously from the reactor after the desired average particle size has been reached.

An example of carrying out the process of the present invention in the above-described equipment to prepare improved $\alpha$-SrHPO$_4$ crystals of luminescent grade is now furnished. The individual reactant solutions consist of a 1.85 molar concentration Sr(NO$_3$)$_2$ and 1.75 molar concentration (NH$_4$)$_2$HPO$_4$ aqueous solutions being supplied continuously to the reaction vessel at flow rates of approximately 8 liters per minute. The Sr(NO$_3$)$_2$ solution is preheated in the heat exchanger to approximately 90° C., whereas the (NH$_4$)$_2$HPO$_4$ solution is preheated to approximately 80° C. in the heat exchanger before introduction into the reaction vessel. Before introduction of said reactant solutions, the reactor is charged with deionized water being maintained at approximately 98° C., and the mechanical stirring means are actuated. As the $\alpha$-SrHPO$_4$ precipitate settles to the bottom of the reactor, the crystals are pumped continuously from the bottom discharge opening to the vacuum filter wheel. After being washed and partially dried, the $\alpha$-SrHPO$_4$ crystalline product is conveyed to the dryer for final drying and then placed in the storage bin. A particle size analysis of the crystalline product thereby obtained as measured by conventional Coulter Counter means is reported in accompanying FIG. 3. As can be noted, the average particle size of said product is approximately 11.6 microns by the Coulter Counter measurement. Additional experience with the above-described embodiment further indicates that varying the reactant flow rates and degree of agitation can vary the average crystal size from approximately 6.1 to 12.8 microns diameter when measured by Fisher Sub Sieve Sizer means.

Other physical properties for the $\alpha$-SrHPO$_4$ product obtained in the aforementioned embodiment invention were compared with a product obtained by conventional means. More particularly, the values listed in Table I below represent a comparison with $\alpha$-SrHPO$_4$ crystal precipitated from aqueous solution utilizing a conventional continuous process.

TABLE I

| Properties | Improved $\alpha$-SrHPO$_4$ | Conventional $\alpha$-SrHPO$_4$ |
| --- | --- | --- |
| Fisher sub sieve size, microns | 6.1 | $\leq 1$ |
| Coulter counter median, microns | 11.6 | |
| Bulk density, grams/liter | 684 | 230 |
| Weight percent NO$_3^-$ | 0.09 | 0.5 |
| Percent loss on ignition | 6.36 | 6.10 |
| Percent Sr$^{++}$ | 46.98 | 47.14 |
| Percent PO$_4^=$ | 50.98 | 51.05 |
| Sr/PO$_4$ ratio | 0.999 | 1.000 |

It will be apparent from the above table that a significant improvement in reduced nitrate residue, bulk density and particle size is obtained with the present process.

It will also be apparent from the above description that a general process and apparatus for continuous crystallization of slightly soluble substances has been provided. It is not intended to limit the present invention to the preferred embodiments above described, however, since various modifications can be made in both process and apparatus without departing from the spirit and scope of the present invention. More particularly, the process can be carried out in reactors of different configuration than herein disclosed and without preheating the reactant solutions so long as there is sufficient control over conditions of reaction to avoid premature precipitation of the crystalline product being formed or gel formation. Additionally, it is contemplated to carry out various modifications of the present process without supplying external heat to the reaction vessel if an endothermic chemical reaction is not involved. It is intended to limit the present invention, therefore, only by the scope of the following claims.

What I claim as new and desire to secure by Letters Patent of the United States is:

1. A process for continuous preparation of α-SrHPO$_4$ phosphor precipitate in the form of a plurality of crystals having a larger average particle size and more narrow size distribution than is conventionally obtained which comprises:
   (a) continuously feeding a solution of a strontium salt through first porous diffusion media into a moving body of solvent,
   (b) continuously feeding a solution of a dibasic phosphate compound through second porous diffusion media spaced apart from said first porous diffusion media into the moving body of solvent,
   (c) heating the moving body of solvent while mixing to form an α-SrHPO$_4$ precipitate, under conditions wherein the reaction is controlled by liquid diffusion between the solutions of a strontium salt and a dibasic phosphate compound, and
   (d) continuously removing said precipitate from the reactant solution.

2. A process as in claim 1 wherein the strontium salt is Sr(NO$_3$)$_2$ and the dibasic phosphate compound is (NH$_4$)$_2$HPO$_4$.

3. A process as in claim 1 wherein the solutions are preheated before introduction into the reaction vessel.

4. A process as in claim 1 which includes continuous removal of the precipitate and unreacted solutions from the reaction vessel.

5. A process as in claim 1 utilizing mechanical means to provide sufficient agitation whereby the α-SrHPO$_4$ crystals being formed are maintained in the moving body of solvent.

6. A process as in claim 1 whereby aqueous solutions of the strontium salt and dibasic phosphate compound are employed.

References Cited

UNITED STATES PATENTS

| | | | |
|---|---|---|---|
| 3,694,151 | 9/1972 | Snethorst et al. | 423—306 |
| 2,946,656 | 7/1960 | Schreurs | 423—308 |
| 3,065,053 | 11/1962 | Aia | 423—310 |
| 3,068,067 | 12/1962 | Aia | 423—308 |
| 3,110,560 | 11/1963 | Ranby et al. | 423—308 |
| 3,113,835 | 12/1963 | Aia | 423—308 |
| 3,384,453 | 5/1968 | Kauders | 423—309 |

FOREIGN PATENTS

| | | | |
|---|---|---|---|
| 3,500,050 | 6/1931 | Great Britain | 423—659 |

OSCAR R. VERTIZ, Primary Examiner

G. A. HELLER, Assistant Examiner

U.S. Cl. X.R.

23—305